United States Patent
Skinlo et al.

(10) Patent No.: US 8,080,329 B1
(45) Date of Patent: Dec. 20, 2011

(54) UNIFORMLY WOUND BATTERY

(75) Inventors: David M. Skinlo, Valencia, CA (US); Baljit S. Nat, Palmdale, CA (US); Hiroyuki Yumoto, Stevenson Ranch, CA (US)

(73) Assignee: Quallion LLC, Sylmar, CA (US)

( * ) Notice: Subject to any disclaimer, the term of this patent is extended or adjusted under 35 U.S.C. 154(b) by 1784 days.

(21) Appl. No.: 10/810,075

(22) Filed: Mar. 25, 2004

(51) Int. Cl.
*H01M 2/14* (2006.01)
*H01M 2/18* (2006.01)
*H01M 4/00* (2006.01)
*H01M 6/10* (2006.01)

(52) U.S. Cl. .......................... 429/130; 429/94; 429/129

(58) Field of Classification Search .................. None
See application file for complete search history.

(56) References Cited

U.S. PATENT DOCUMENTS

| | | |
|---|---|---|
| 701,917 A | 6/1902 | Morrison |
| 2,463,565 A | 3/1949 | Ruben |
| 2,562,215 A | 7/1951 | Ruben |
| 3,245,837 A | 4/1966 | Ikeda et al. |
| 3,373,060 A | 3/1968 | Gray |
| 3,510,353 A | 5/1970 | McHenry |
| 3,536,532 A | 10/1970 | Nobuatsu Watanabe et al. |
| 3,669,746 A * | 6/1972 | Devitt et al. ............ 429/94 |
| 3,700,502 A | 10/1972 | Nobuatsu Watanabe et al. |
| 3,775,182 A | 11/1973 | Patton et al. |
| 4,009,056 A | 2/1977 | Megahed et al. |
| 4,052,537 A | 10/1977 | Mallory |
| 4,053,687 A | 10/1977 | Coibion et al. |
| 4,053,692 A | 10/1977 | Dey |
| 4,056,885 A | 11/1977 | Rao |
| 4,091,188 A | 5/1978 | Dey |
| 4,105,833 A | 8/1978 | Greatbatch et al. |
| 4,121,020 A | 10/1978 | Epstein et al. |
| 4,226,920 A | 10/1980 | Armstrong |
| 4,247,608 A | 1/1981 | Watanabe et al. |
| 4,259,416 A | 3/1981 | Ikeda et al. |
| 4,268,587 A | 5/1981 | Farrington et al. |
| 4,271,242 A | 6/1981 | Toyoguchi et al. |
| 4,352,867 A | 10/1982 | Catanzarite |
| 4,385,101 A | 5/1983 | Catanzarite |

(Continued)

FOREIGN PATENT DOCUMENTS

CA 480611 1/1952

(Continued)

OTHER PUBLICATIONS

Factory completed from 3E Labs web page; www.3elabs.com/pacies/ft_c2.html; 1 pages, Retrieved Apr. 18, 2002.

(Continued)

*Primary Examiner* — R Hodge
(74) *Attorney, Agent, or Firm* — Gavrilovich, Dodd & Lindsay, LLP

(57) ABSTRACT

Disclosed is an electric storage battery and method of making it, comprising a jellyroll electrode assembly in which electrodes are wound around a pin, and having one or more spacers at or near the inner ends of the electrodes to aid in winding the jellyroll. Also disclosed is an electric storage battery, and method of making it, comprising a jellyroll electrode assembly in which electrodes are wound around a pin, and having a plastic slotted tube closely fitted around the pin and covering the junction of the pin to an electrode substrate or interface material coupled to the electrode substrate. The spacers and plastic slotted tube may be used separately or together.

16 Claims, 9 Drawing Sheets

U.S. PATENT DOCUMENTS

| | | | |
|---|---|---|---|
| 4,386,137 A | 5/1983 | Watanabe et al. | |
| 4,391,729 A | 7/1983 | Liang et al. | |
| 4,476,624 A | 10/1984 | Klein et al. | |
| 4,502,903 A | 3/1985 | Bruder | |
| 4,539,272 A | 9/1985 | Goebel | |
| 4,539,274 A | 9/1985 | Goebel | |
| 4,565,752 A | 1/1986 | Goebel et al. | |
| 4,565,753 A | 1/1986 | Goebel et al. | |
| 4,604,333 A | 8/1986 | Ikeda et al. | |
| 4,638,555 A | 1/1987 | MacLachlan et al. | |
| 4,767,682 A | 8/1988 | Dorogi et al. | |
| 4,802,275 A | 2/1989 | Freluche | |
| 4,822,377 A | 4/1989 | Wolff | |
| 4,863,815 A | 9/1989 | Chang | |
| 4,879,190 A | 11/1989 | Lundsgaard | |
| 4,929,519 A | 5/1990 | Catotti | |
| 4,942,101 A | 7/1990 | Audebert et al. | |
| 4,966,822 A | 10/1990 | Johnston | |
| 5,008,161 A | 4/1991 | Johnston | |
| 5,008,165 A | 4/1991 | Schmöde | |
| 5,017,442 A | 5/1991 | Watanabe et al. | |
| 5,021,306 A | 6/1991 | Sauer et al. | |
| 5,047,068 A | 9/1991 | Stoklosa | |
| 5,114,811 A | 5/1992 | Ebel et al. | |
| 5,116,698 A | 5/1992 | Sears | |
| 5,147,747 A | 9/1992 | Wilson et al. | |
| 5,306,581 A | 4/1994 | Taylor et al. | |
| 5,344,724 A | 9/1994 | Ozaki et al. | |
| 5,360,678 A | 11/1994 | Spillman et al. | |
| 5,422,201 A | 6/1995 | Georgopoulos | |
| 5,423,110 A | 6/1995 | Gauthier et al. | |
| 5,501,916 A | 3/1996 | Teramoto et al. | |
| 5,514,492 A | 5/1996 | Marincic et al. | |
| 5,543,249 A | 8/1996 | Takeuchi et al. | |
| 5,558,962 A | 9/1996 | Marincic et al. | |
| 5,571,632 A | 11/1996 | Teramoto | |
| 5,584,893 A | 12/1996 | Mitchell | |
| 5,597,658 A | 1/1997 | Kejha | |
| 5,667,912 A | 9/1997 | Georgopoulos | |
| 5,736,270 A | 4/1998 | Suzuki et al. | |
| 5,755,759 A | 5/1998 | Cogan | |
| 5,795,680 A | 8/1998 | Ikeda et al. | |
| 5,804,327 A | 9/1998 | Oltman | |
| 5,821,011 A | 10/1998 | Taylor et al. | |
| 5,882,815 A | 3/1999 | Tagawa | |
| 5,891,593 A | 4/1999 | Keller et al. | |
| 5,900,720 A | 5/1999 | Kallman et al. | |
| 5,912,089 A | 6/1999 | Kitano et al. | |
| 5,925,482 A | 7/1999 | Yamashita | |
| 5,948,563 A | 9/1999 | Kawase et al. | |
| 5,965,291 A | 10/1999 | Pyszczek | |
| 5,989,751 A | 11/1999 | Cotte et al. | |
| 6,007,938 A | 12/1999 | Blancheton | |
| 6,020,084 A | 2/2000 | Romero et al. | |
| 6,030,422 A | 2/2000 | Pyszczek | |
| 6,033,795 A | 3/2000 | Broussely et al. | |
| 6,042,957 A | 3/2000 | Oltman | |
| 6,057,060 A | 5/2000 | Yu | |
| 6,090,503 A | 7/2000 | Taylor et al. | |
| 6,114,059 A | 9/2000 | Watanabe et al. | |
| 6,132,898 A | 10/2000 | Kawamura | |
| 6,165,641 A | 12/2000 | Striebel et al. | |
| 6,180,285 B1 | 1/2001 | Yoshida et al. | |
| 6,190,803 B1 | 2/2001 | Tomiyama et al. | |
| 6,225,007 B1 | 5/2001 | Horne et al. | |
| 6,228,536 B1 | 5/2001 | Wasynczuk | |
| 6,242,129 B1 | 6/2001 | Johnson | |
| 6,245,452 B1 | 6/2001 | Oltman | |
| 6,265,099 B1 | 7/2001 | Gauthier et al. | |
| 6,265,100 B1 | 7/2001 | Saaski et al. | |
| 6,308,101 B1 | 10/2001 | Faltys et al. | |
| 6,319,627 B1 | 11/2001 | Snyder et al. | |
| 6,325,611 B1 | 12/2001 | Iwasaki et al. | |
| 6,348,282 B1 | 2/2002 | Okochi et al. | |
| 6,379,403 B1 | 4/2002 | Fukumura et al. | |
| 6,379,839 B1 | 4/2002 | Inoue et al. | |
| 6,387,561 B1 | 5/2002 | Nemoto et al. | |
| 6,399,242 B2 | 6/2002 | Kitoh et al. | |
| 6,410,187 B1 | 6/2002 | Luo et al. | |
| 6,410,189 B1 | 6/2002 | Yamada et al. | |
| 6,432,574 B1 | 8/2002 | Suzuki et al. | |
| 8,451,463 | 9/2002 | Probst et el. | |
| 6,458,490 B1 | 10/2002 | Hommura et al. | |
| 6,503,646 B1 | 1/2003 | Ghantous et al. | |
| 6,503,657 B1 | 1/2003 | Takami et al. | |
| 6,506,514 B1 | 1/2003 | Endo et al. | |
| 6,576,365 B1 | 6/2003 | Meitav et al. | |
| 6,641,953 B2 | 11/2003 | Takeuchi et al. | |
| 6,667,132 B2 | 12/2003 | Okochi et al. | |
| 6,677,076 B2 | 1/2004 | Nakahara et al. | |
| 6,727,022 B2 | 4/2004 | Gan et al. | |
| 7,066,971 B1 * | 6/2006 | Carlson | 29/623.5 |
| 2001/0031398 A1 | 10/2001 | Hashimoto et al. | |
| 2001/0033972 A1 | 10/2001 | Kawai et al. | |
| 2001/0044047 A1 | 11/2001 | Gan et al. | |
| 2001/0490544 | 12/2001 | Enomoto et al. | |
| 2002/0001745 A1 | 1/2002 | Gartstein | |
| 2002/0004161 A1 | 1/2002 | Yamaguchi | |
| 2002/0076605 A1 | 6/2002 | Akashi et al. | |
| 2002/0146626 A1 | 10/2002 | Komatsu et al. | |
| 2002/0187399 A1 | 12/2002 | Johnson et al. | |
| 2003/0022062 A1 | 1/2003 | Wutz et al. | |
| 2003/0089889 A1 | 5/2003 | Park et al. | |
| 2003/0104282 A1 | 6/2003 | Xing et al. | |
| 2003/0113628 A1 | 6/2003 | Paulot et al. | |
| 2003/0134188 A1 | 7/2003 | Roy et al. | |
| 2003/0134191 A1 | 7/2003 | Buckle et al. | |
| 2003/0138697 A1 | 7/2003 | Leising et al. | |
| 2003/0198868 A1 | 10/2003 | Takeuchi et al. | |
| 2004/0018421 A1 * | 1/2004 | LaFollette et al. | 429/122 |
| 2004/0029005 A1 | 2/2004 | Leising et al. | |
| 2004/0048148 A1 | 3/2004 | Skinlo | |
| 2004/0049908 A1 | 3/2004 | Tsukamoto et al. | |
| 2004/0053115 A1 | 3/2004 | Skinlo | |
| 2004/0053116 A1 | 3/2004 | Skinlo | |
| 2004/0053117 A1 | 3/2004 | Tsukamoto et al. | |
| 2004/0053118 A1 | 3/2004 | Tsukamoto et al. | |
| 2004/0053119 A1 | 3/2004 | Tsukamoto et al. | |
| 2004/0055146 A1 | 3/2004 | Tsukamoto et al. | |
| 2004/0058236 A1 | 3/2004 | Tsukamoto et al. | |
| 2006/0035147 A1 * | 2/2006 | Lam et al. | 429/218.1 |

FOREIGN PATENT DOCUMENTS

| | | |
|---|---|---|
| EP | 0942484 B1 | 9/1999 |
| EP | 01296389 A1 | 3/2003 |
| EP | 01331683 A2 | 7/2003 |
| EP | 1388905 A2 | 2/2004 |
| JP | 58-030073 A2 | 2/1983 |
| JP | 59-042783 A | 3/1984 |
| JP | 01151150 A | 6/1989 |
| JP | 3046772 A2 | 2/1991 |
| JP | 03-093156 A2 | 4/1991 |
| JP | 3222257 A2 | 10/1991 |
| JP | 4206366 A2 | 7/1992 |
| JP | 7249403 A2 | 9/1995 |
| JP | 9330707 A2 | 12/1997 |
| JP | 10289708 A2 | 10/1998 |
| JP | 11260372 A2 | 9/1999 |
| JP | 11-329444 | 11/1999 |
| JP | 2000036324 A | 9/2000 |
| JP | 2000348754 A2 | 12/2000 |
| WO | WO 02/078113 A1 | 10/2002 |
| WO | WO 03-061038 A1 | 7/2003 |
| WO | WO 03-061051 A1 | 7/2003 |
| WO | WO 03/096446 A1 | 11/2003 |

OTHER PUBLICATIONS

A. Rawle, "Basic Principles of Particle Size Analysis," Malvern Instruments Limited, downloaded from http://www.malvern.co.uk/malvern/rw_malvern.nsf/vwa_docref/IWTM%20particle%20size, no date.

Unpublished International Application PCT/US03/21343, Applicant Quallion LLC, Inventors Lam et al., International Filing Date Jul. 9, 2003.

Preliminary Amendment filed in U.S. Appl. No. 10/666,873, Tsukamoto et al., filed Sep. 17, 2003.

International Preliminary Examination Report, dated Oct. 30, 2003, received in relation to Application No. PCT/US03/01334.

Preliminary Amendment filed in U.S. Appl. No. 10/478,920, Lam et al., filed Nov. 19, 2003.

Preliminary Amendment filed in U.S. Appl. No. 10/478,706, Nakahara et al., filed Nov. 19, 2003.

Preliminary Amendment filed in U.S. Appl. No. 10/484,474, Tsukamoto et al., filed Jan. 20, 2004.

Factory completed from 3E Labs web page; www.3elabs.com/pages/ft_c2.html; 1 page, Retrieved Apr. 18, 2002.

Three E Laboratories Inc. homepage; www.3elabs.com; 2 pages, Retrieved Apr. 18, 2002.

Swage Crimp by 3E Labs; Hernacrimp seal terminals and feed throughs; www.3elabs.com/pages/ft_c.html; 2 pages, Retrieved Apr. 18, 2002.

Japanese packaging from National for Battery, BR425/2B; 2 pages, Date Unknown.

International Preliminary Examination Report, dated Nov. 28, 2003, received in relation to Application No. PCT/US03/01338.

Table 14.4 Cathode Materials Used in Lithium Primary Batteries, Date Unknown.

International Search Report, dated Mar. 1, 2004, received in relation to Application No. PCT/US03/21343.

* cited by examiner

UNIFORMLY WOUND BATTERY

CROSS REFERENCE TO RELATED APPLICATIONS

This invention is related to copending U.S. patent application Ser. No. 10/478,920, which is national stage of PCT Application PCT/US03/21343, which claims priority to copending PCT Application PCT/US03/01338 (U.S. national stage Ser. No. 10/484,474), which claims priority to U.S. patent application Ser. No. 10/167,688, now U.S. Pat. No. 6,670,071; and to copending U.S. patent application Ser. No. 10/478,706, which is U.S. national stage of PCT Application PCT/US03/01334, which claims priority to U.S. patent application Ser. No. 10/171,351, now U.S. Pat. No. 6,677,076; each of which claims priority to U.S. Provisional Application Ser. No. 60/348,665; each of which is assigned to the assignee of the present invention and incorporated herein by reference. This invention is also related to copending U.S. patent application Ser. No. 10/666,861, which is a continuation of Ser. No. 10/167,688, and to copending U.S. patent application Ser. Nos. 10/666,860, 10/666,340, 10/666,873, 10/665,687, 10/665,440, 10/666,790, 10/665,509, 10/666,379, which are divisionals of Ser. No. 10/167,688, each of which is assigned to the assignee of the present invention and incorporated herein by reference.

FIELD

This invention relates generally to electric storage batteries and more particularly to construction of battery having a uniformly wound electrode assembly.

BACKGROUND

Electric storage batteries are commercially available in a wide range of sizes for use in a variety of applications. As battery technology continues to improve, batteries find new applications that impose increasingly stringent specifications relating to physical size and performance. New technologies have yielded smaller and lighter weight batteries having longer storage lives and higher energy output capabilities enabling an increasing range of applications, including medical applications, where, for example, the battery can be used in a medical device that is implanted in a patient's body. Such medical devices can be used to monitor and/or treat various medical conditions. Batteries for implantable medical devices are subject to very demanding requirements, including long useful life, high power output, low self-discharge rates, compact size, high reliability over a long time period, and compatibility with the patient's internal body chemistry.

SUMMARY

Disclosed is an electric storage battery, having a uniformly wound electrode assembly. In a first aspect of the invention, the electrode assembly includes an elongate pin, first and second opposite polarity electrode strips wound together to form a spiral roll, wherein the first electrode strip is attached to the pin, either directly or via an optional interface material, forming a pin junction on the pin; wherein the first electrode strip comprises a foil substrate having an active material coating on its first face, and wherein the first face has an uncoated portion at the inner end; and a first insulating spacer positioned on at least a portion of the first face inner end uncoated portion and/or on the optional interface material. The spacer may comprise polyimide and may have a thickness approximately equal to that of the coating. The spacer preferably has adhesive on one surface to hold it in place, and preferably comprises Kapton polyimide tape. The substrate may have an active material coating on its second face wherein the second face has an uncoated portion at the inner end, and the battery may further comprise a second insulating spacer positioned on at least a portion of the second face inner end uncoated portion and/or on the optional interface material. The battery may further comprise a nonconductive slotted tube, which may comprise polypropylene, closely fitted around the pin and covering the pin junction.

In a second aspect of the invention, the electrode assembly includes an elongate pin; and first and second opposite polarity electrode strips wound together to form a spiral roll, wherein the first electrode strip is attached to the pin, either directly or via an optional interface material, forming a pin junction on the pin; and a nonconductive slotted tube closely fitted around the pin and covering the pin junction. The slotted tube may comprise polypropylene, perfluoroalkoxy (PFA), or other plastic, and preferably has an inner diameter of 0.38 to 1.5 mm and a wall thickness of about 0.5 to 0.75 mm.

In a third aspect of the invention a method of making an electrode assembly comprises providing first and second opposite polarity electrode strips wherein the first electrode strip comprises a substrate comprising a first material, the substrate having an active material coating on its first face wherein the first face has an uncoated portion at the inner end; providing a pin comprising a second material; electrically coupling the first electrode strip to the pin, either directly or via an interface material, forming a pin junction; positioning a spacer on at least a portion of the first face inner end uncoated portion and/or interface material; and winding the first and second opposite polarity electrode strips together to form a spiral roll. The substrate may have an active material coating on its second face wherein the second face has an uncoated portion at the inner end, and the method may further comprise positioning a second spacer on at least a portion of the second face inner end uncoated portion and/or interface material.

In a fourth aspect of the invention a method of making an electrode assembly comprises providing first and second opposite polarity electrode strips; providing a pin; electrically coupling the first strip to the pin, either directly or via an optional interface material, forming a pin junction; closely fitting a nonconductive slotted tube around the pin and covering the pin junction; and winding the first and second opposite polarity electrode strips together to form a spiral roll.

DETAILED DESCRIPTION

The present invention is directed to a primary or secondary electric storage battery incorporating one or more aspects described herein for enhancing battery reliability while minimizing battery size. In addition, the invention is directed to a method for efficiently manufacturing the battery at a relatively low cost.

Exemplary dimensions are provided primarily to convey an order of magnitude to the reader to facilitate an understanding of the text and drawings. Although the indicated dimensions accurately reflect one exemplary embodiment of the invention, it should be appreciated that the invention can be practiced utilizing components having significantly different dimensions.

The electric storage battery of the present invention generally comprises a metal case enveloping an interior cavity which contains an electrode assembly surrounded by a suitable electrolyte. The electrode assembly comprises positive electrode, negative electrode, and separator layers which are stacked and spirally wound to form a jellyroll. In a preferred embodiment, the positive electrode is formed of a metal substrate having positive active material coated on both faces of the substrate. Similarly, the negative electrode is formed of a metal or other electrically conductive substrate having negative active material coated on both faces of the substrate. In forming an electrode assembly, separator layers are interleaved between the positive and negative electrode layers to provide electrical isolation.

A battery case in accordance with the invention comprises a tubular case body having open first and second ends. The feedthrough preferably carries a first endcap physically secured to, but electrically insulated from, a pin. The pin is used during the manufacturing process as an arbor to facilitate winding the layers to form an electrode assembly jellyroll. This first endcap is preferably secured to the case body, as by laser welding, to close the open first end and form a leak free seal. With the jellyroll mounted in the case and the first endcap sealed, the interior cavity can thereafter be filled with electrolyte from the open second end. The second end is then sealed.

Figure 1:
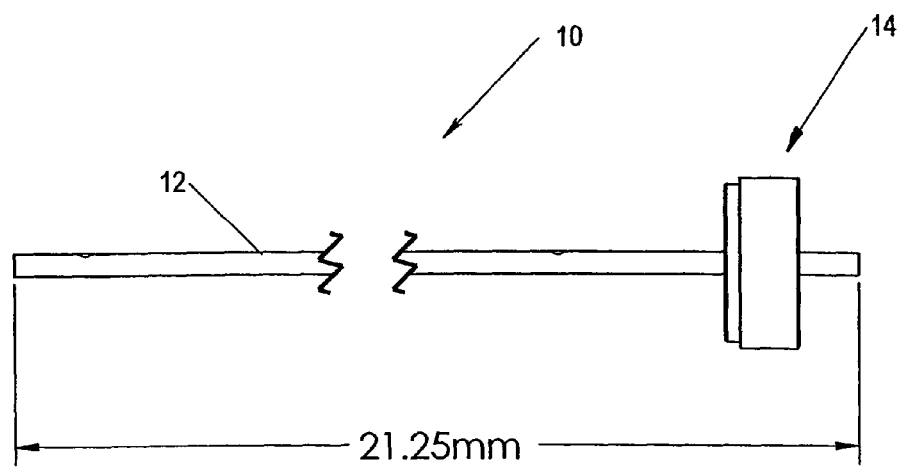
FIG. 1 is a side view of a feedthrough pin subassembly.
Figure 2:
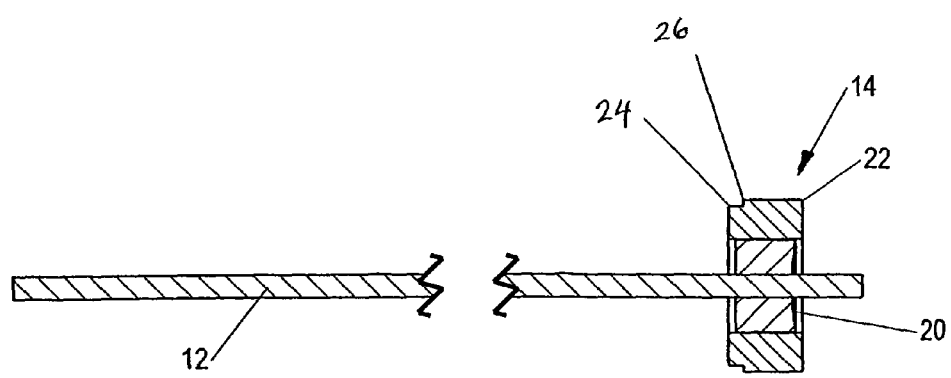
FIG. 2 is a longitudinal sectional view through the subassembly of FIG. 1.

Attention is initially directed to FIGS. 1 and 2 which illustrate a preferred feedthrough pin subassembly 10 utilized in accordance with the present invention. The subassembly 10 comprises an elongate pin 12, preferably formed of a solid electrically conductive material, having low electrical resistance and high corrosion resistance. For a positively charged pin, the material is preferably platinum iridium, and more preferably 90Pt/10Ir. For a negatively charged pin, the pin material is chosen such that it does not react with the negative active material; commercially pure titanium (CP Ti) is a preferred material for negative pins. The pin 12 extends through, and is hermetically sealed to a header 14. The header 14 comprises a glass hollow cylinder 20 hermetically sealed to the pin 12 and to the inner surface of an electrically conductive hollow member 22, e.g., titanium-6Al-4V. The conductive hollow material 22 functions as a battery case endcap that is used to seal the battery case. The inner edge 24 of conductive hollow material 22 preferably has a step 26 formed thereon to aid in seating and welding the endcap onto the battery case. Step 26 is particularly useful when laser welding in the radial direction to block laser light from entering the inside of the battery. A topside electrode insulator (not shown), which may comprise a thin disk of DuPont KAPTON® polyimide film, is slipped onto the pin 12 adjacent the header 14.

Figure 3:
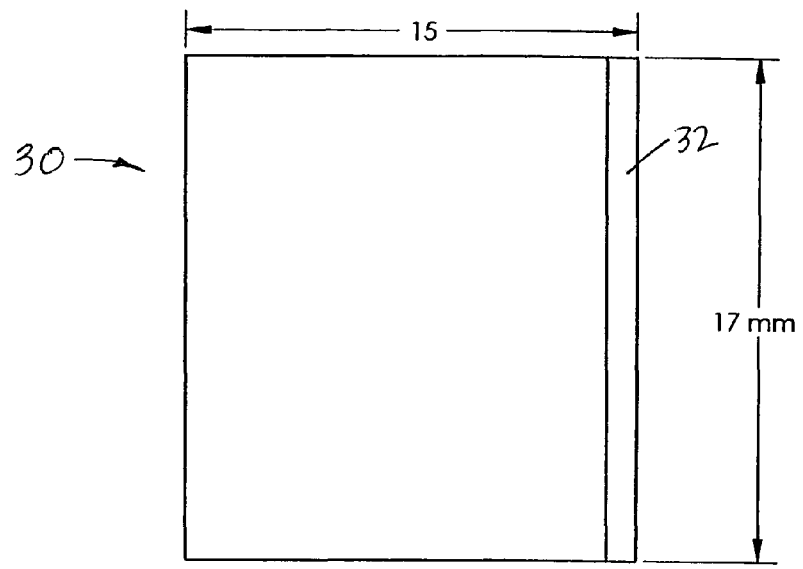
FIG. 3 is a plan view of a positive electrode strip utilized in the exemplary preferred electrode assembly in accordance with the invention.
Figure 4:
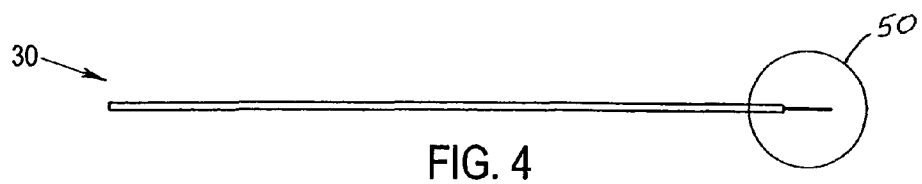
FIG. 4 is a side view of the positive electrode strip of FIG. 3.
Figure 5:
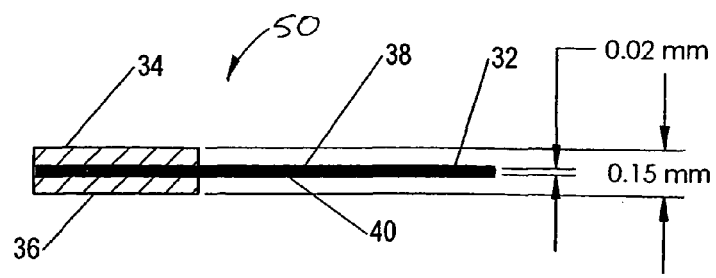
FIG. 5 is an enlarged sectional view of the inner end of the positive electrode strip of FIGS. 3 and 4.

Attention is now directed to FIGS. 3-5, which illustrate a preferred positive electrode strip 30 which is utilized in the fabrication of a preferred spirally wound jellyroll electrode assembly in accordance with the present invention. The positive electrode strip 30 comprises a metal substrate 32 formed, for example, of aluminum. Preferably, substrate 32 comprises a foil. Positive electrode active material 34, 36 is deposited, respectively on the upper and lower faces 38 and 40 of the substrate 32. Note in FIGS. 3-5 that the right end of the substrate 32 is bare, i.e. devoid of positive active material on both the upper and lower faces 38, 40.

Figure 6:
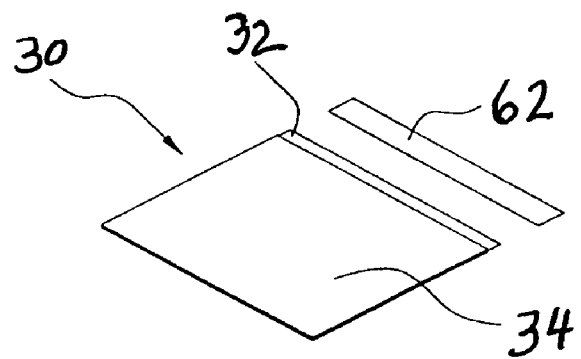
FIGS. 6-8 are isometric views showing a structure and method for attaching an electrode to a pin using an interface material.
Figure 7:
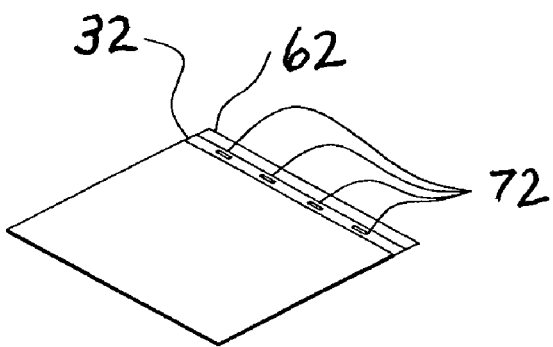
Figure 8:
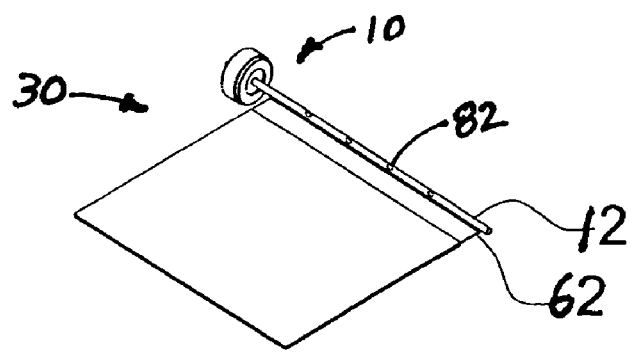

The inner end 50 of the electrode substrate 32 may be directly physically and electrically connected to the feedthrough pin, as by resistance welding. Alternatively, as shown in FIGS. 6-8, an interface material is used to connect the substrate to the feedthrough pin. In designs in which the electrode substrate and pin materials are not matched for direct welding, this interface material serves as an intermediate material that is weldable to both the substrate and the pin. This feature improves the mechanical strength of the joint between the electrode assembly and the pin for improved winding and performance. This makes the connection between the components easily adaptable to design and material changes and simplifies processing.

In a preferred configuration, interface material 62 is welded to the substrate 32 of a positive electrode 30. Preferably, interface material 62 and pin 12 comprise a titanium material and electrode 30 comprises an aluminum substrate 32 having active materials 34, 36 disposed on both sides. FIG. 6 shows the interface material 62 before joining to the electrode. It preferably comprises CP titanium or nickel, which can be welded to both the aluminum substrate and to the titanium feedthrough pin, facilitating their connection. Interface material 62 preferably is dimensioned to have a length approximately the same length as the edge of the substrate to which it will be welded. FIG. 7 shows interface material 62 welded to substrate 32 at least one interface junction 72. FIG. 8 shows pin 12 welded to interface material 62 at least one pin junction 82, preferably using a resistance weld for good electrical contact, with ultrasonic welding being an alternative method.

Figure 9:
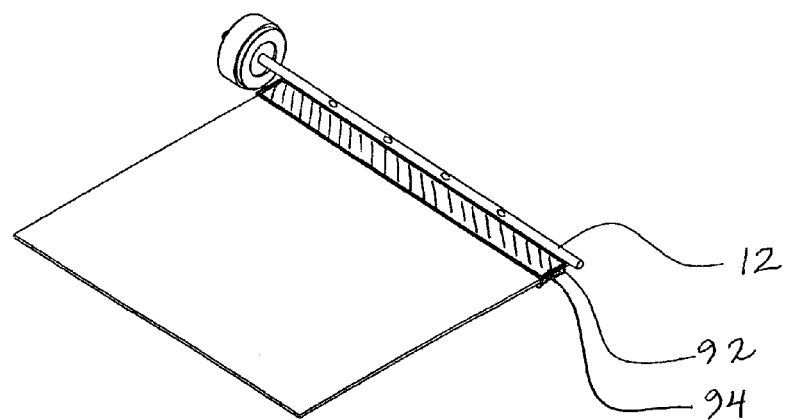
FIG. 9 illustrates positioning spacers onto the electrode-pin subassembly of FIG. 8.
Figure 13:
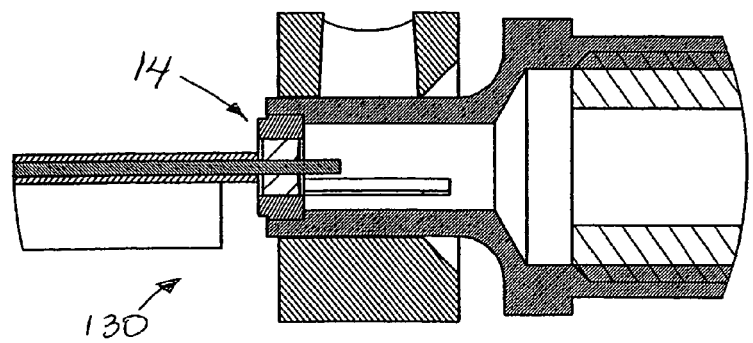
FIG. 13 is an enlarged cross sectional view showing the subassembly of FIG. 10 fixtured to a driver attached to a drive motor for rotating the subassembly to form the jellyroll.
Figure 14:
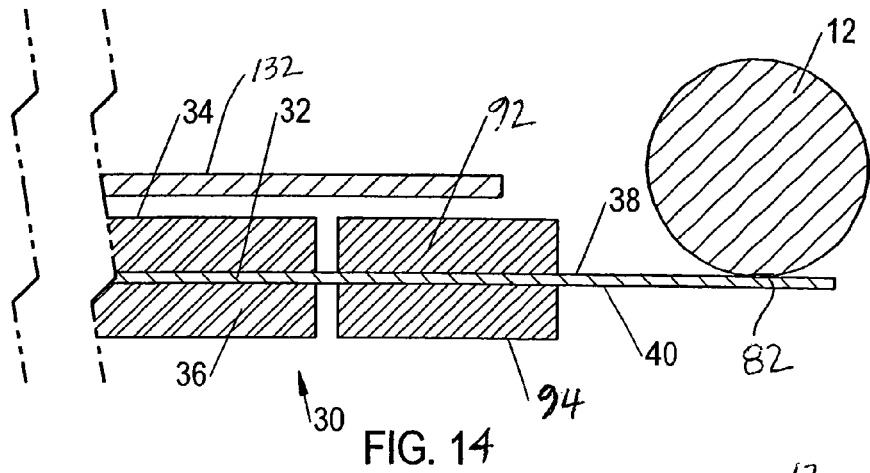
FIGS. 14-16 show cross sectional views of various embodiments of the electrode to pin assembly of the present invention, having spacers positioned at the inner end of the electrode.
Figure 15:
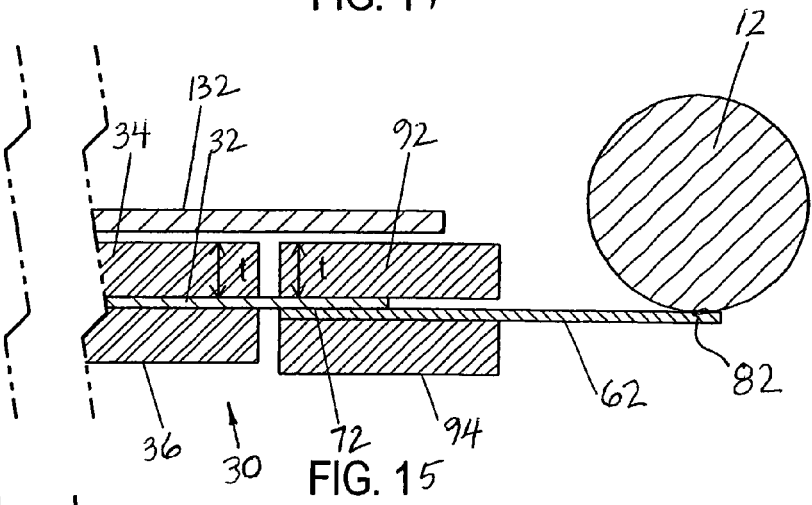

FIG. 9 shows spacers 92, 94 positioned on the subassembly of FIG. 8, and are shown in more detail in FIGS. 13-15.

Figure 10:
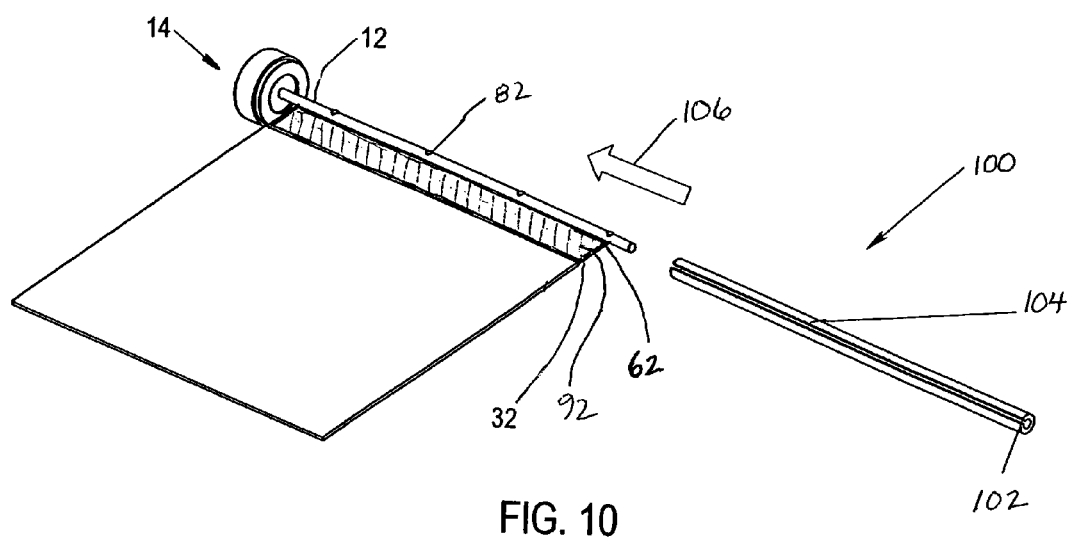
FIG. 10 is a plan view showing a plastic slotted tube being installed over the subassembly of FIG. 9.

FIG. 10 depicts a slotted tube 100 comprising an elongate plastic tube 102 having a longitudinal slot 104 extending along the length thereof. The arrow 106 depicts how the tube 100 is slid over the pin 12 and interface material 62 (or substrate 32 if interface material 62 is not used), preferably overlaying the line of spot welds at pin junction 82.

Figure 11:
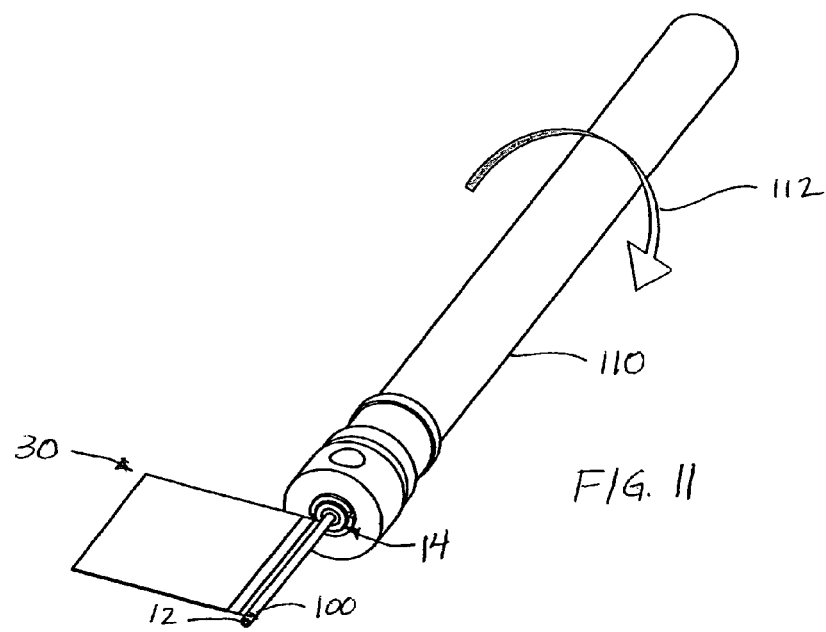
FIG. 11 is a schematic view.
Figure 12:
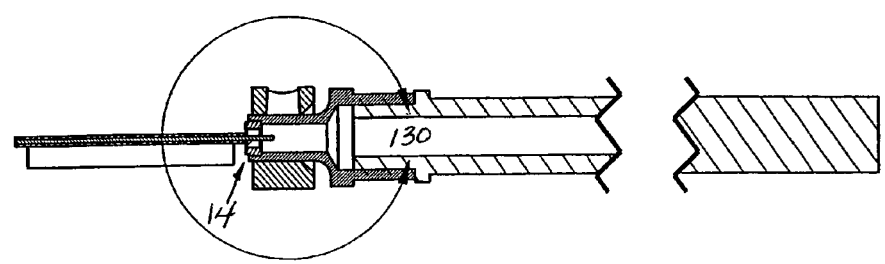
FIG. 12 is a cross sectional view.

FIGS. 11-13 show the slotted tube 100 on the pin 12 with the positive electrode strip 30 extending tangentially to the pin 12 and terminating approximately adjacent the end of slotted tube 100. This subassembly is fixtured to a driver 110 attached to a drive motor 112 (shown schematically by an arrow) for driving the driver. With the pin subassembly header 14 supported for rotation, energization of the motor 112 will spin the driver 110 to rotate the subassembly (along with additional components as will be described later) around its longitudinal axis to form a jellyroll electrode assembly.

Figure 16:
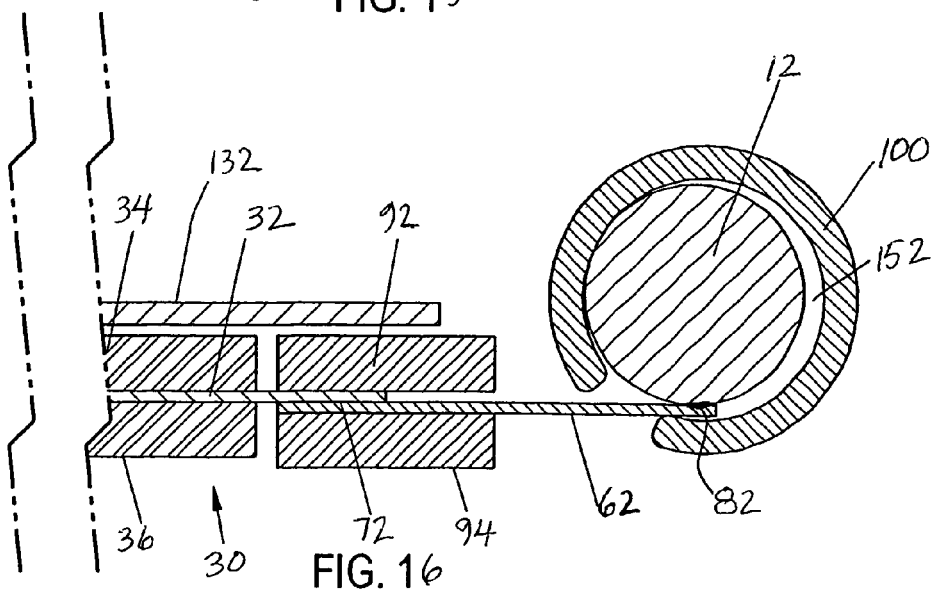

FIGS. 14-16 show alternative embodiments of the electrode to pin assembly of the present invention. In FIG. 14, the positive electrode strip 30 comprises a metal substrate 32 formed, for example, of aluminum. Positive electrode active material 34, 36 is deposited, respectively on the upper and lower faces 38 and 40 of the substrate 32. Note that the right end of the substrate 32 forms the inner end and is bare, i.e. devoid of positive active material on both the upper and lower faces 38, 40. In the region of the uncoated portion, a first spacer 92 is placed adjacent the uncoated portion of upper face 38 to make up for the lack of coating on upper face 38, and a second spacer 94 is placed adjacent the uncoated portion of lower face 40 to make up for the lack of coating on lower face 40. A separator 132 overlies the electrode and first spacer. These spacers 92, 94 serve to protect the edges of the electrodes and prevent them from damaging the separator. The uncoated portion of the first face of the electrode strip is joined to the pin 12 at a pin junction 82.

FIG. 15 shows an embodiment similar to that of FIG. 14, except that instead of joining the electrode substrate directly to the pin 12, an interface material 62 is used to join the electrode substrate 32 to pin 12, as described with respect to FIGS. 6-8 above. The thickness, t, of the first spacer 92 is approximately the same thickness as the first face coating 34, and the thickness of the second spacer 94 is approximately the same thickness as the second face coating 36. The thickness of both face coatings 34 and 36 are generally preferably about the same as each other, so the thickness of spacers 92 and 94 are also about the same. In this embodiment in which the electrode substrate is joined to the pin via an interface material, the spacers may overlie the uncoated end of the electrode substrate, or a portion of the interface material 62, or a portion of both.

FIG. 16 shows an embodiment wherein a plastic slotted tube 100 has been slid over pin 12 to aid in the electrode winding process. The tube may be injection molded, extruded, or otherwise formed having a slot therein; alternatively, the slot may be formed after forming the tube. For example, the tube may be extruded as a circular tube and slit along its length, forming a closed or substantially closed C shape. The term "slotted tube" as used herein is to be understood as being substantially tubular and having an opening along at least most of its length. Its inner and/or outer diameters may be circular or noncircular in cross section; for example, either the ID or OD or both may be oval. Its primary functions are providing a more uniform base for winding, increasing the diameter of the first wind, and maintaining alignment. It further serves to protect against damage to the separator that can lead to microshorts. When made of an insulating plastic, it also serves to act as an insulator. Plastic slotted tube 100 may comprise polypropylene, perfluoroalkoxy (PFA), or other plastic, and preferably extends to cover both ends of the interface material 62, or of electrode substrate 32 if interface material 62 is not used. FIG. 16 is shown using the interface material 62 of FIG. 15, but plastic slotted tube 100 alternatively may be used with the embodiment of FIG. 14 without interface material 62, and, as another alternative, may be used without spacer 92 and/or spacer 94. If configured with enough space 152, plastic slotted tube 100 may be used as an electrolyte filling conduit.

Figure 17:
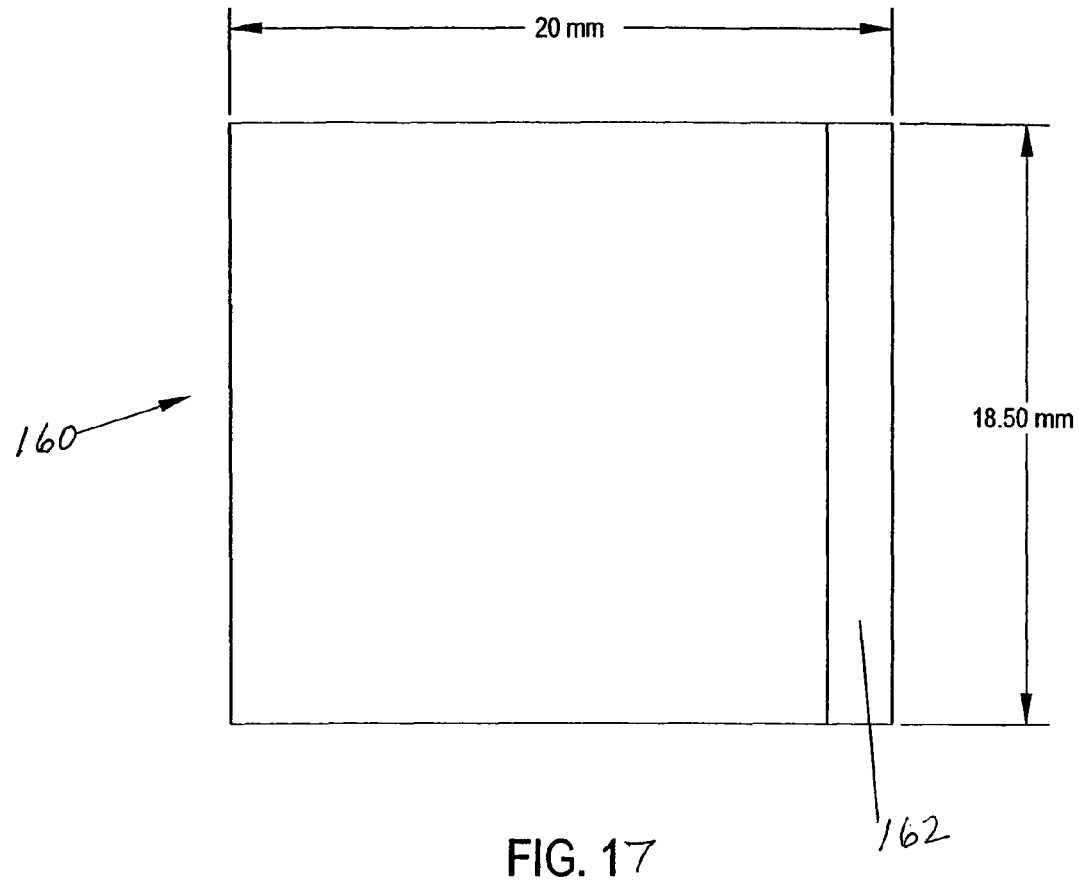
FIG. 17 is a plan view of a negative electrode strip utilized in the exemplary preferred electrode assembly in accordance with the invention.
Figure 18:
FIG. 18 is a side view of the negative electrode strip of FIG. 17.
Figure 19:
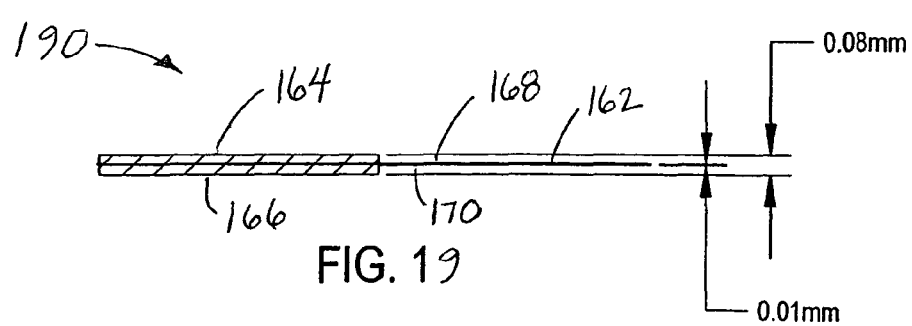
FIG. 19 is an enlarged sectional view of the outer end of the negative electrode strip of FIGS. 17 and 18.

In a preferred embodiment for primary batteries, a negative electrode strip comprises a single sheet of lithium without any substrate. For secondary batteries, a negative electrode strip preferably comprises a substrate having active material coated thereon. FIGS. 17-19 depict an exemplary negative electrode strip 160 comprising a substrate 162, e.g. titanium, having negative active material formed on respective faces of the substrate. Preferably, the substrate 162 comprises a foil. As shown in FIGS. 18 and 19, negative active material 164 is deposited on the substrate upper surface 168 and negative active material 166 is deposited on the substrate lower surface 170. FIG. 19 depicts the configuration of the outer end 190 of the negative electrode strip 160 shown at the right side of FIGS. 17 and 18, showing that both upper and lower surfaces 168 and 170 are devoid of active material at the outer end 190. These bared portions may be provided by masking the substrate prior to coating, by scraping active material after coating, or by other means well known in the art.

Figure 20:
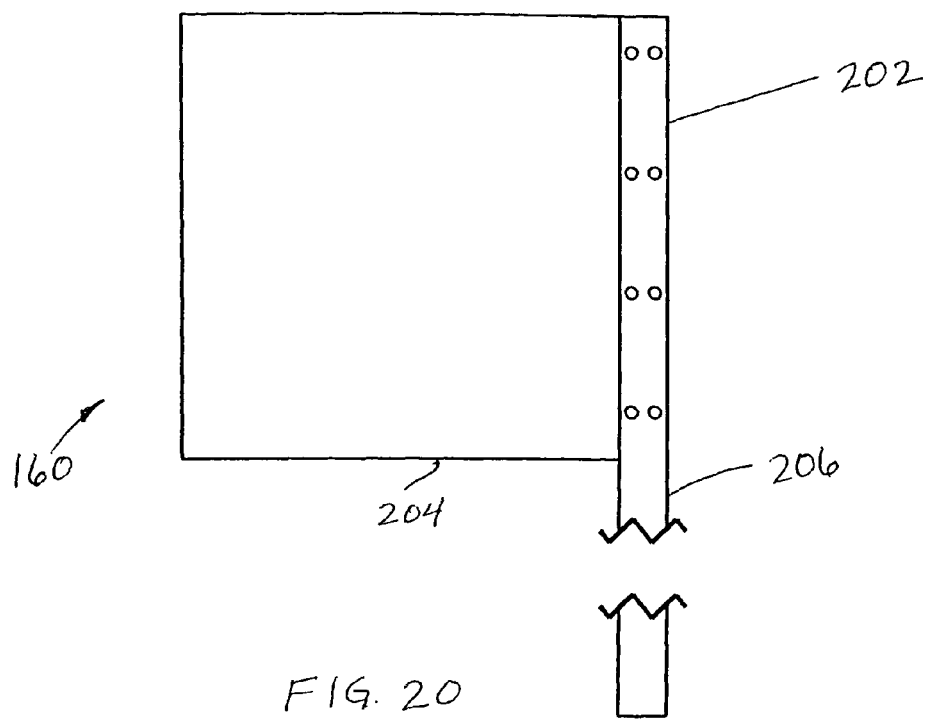
FIG. 20 is a plan view of the negative electrode strip showing the attachment of a flexible electrically conductive tab to the bare outer end of the negative electrode substrate.

As shown in FIG. 20, a flexible metal tab 202 is welded crosswise to the negative electrode strip 160 so as to extend beyond edge 204. A portion 206 of tab 202 cantilevered beyond edge 204 is utilized to mechanically and electrically connect to an endcap for closing a battery case. In a preferred embodiment for primary batteries in which negative electrode strip 160 comprises a single sheet of foil without a substrate, such as lithium metal foil or lithium aluminum alloy foil, tab 202 is directly mechanically and electrically coupled to the lithium metal foil. For batteries in which negative electrode strip 160 comprises a substrate having active material coated thereon, tab 202 is preferably welded to a bare portion of the substrate. In an alternative embodiment, the tab 202 may simply be a bare portion of the substrate instead of a separate component joined thereto.

Figure 21:
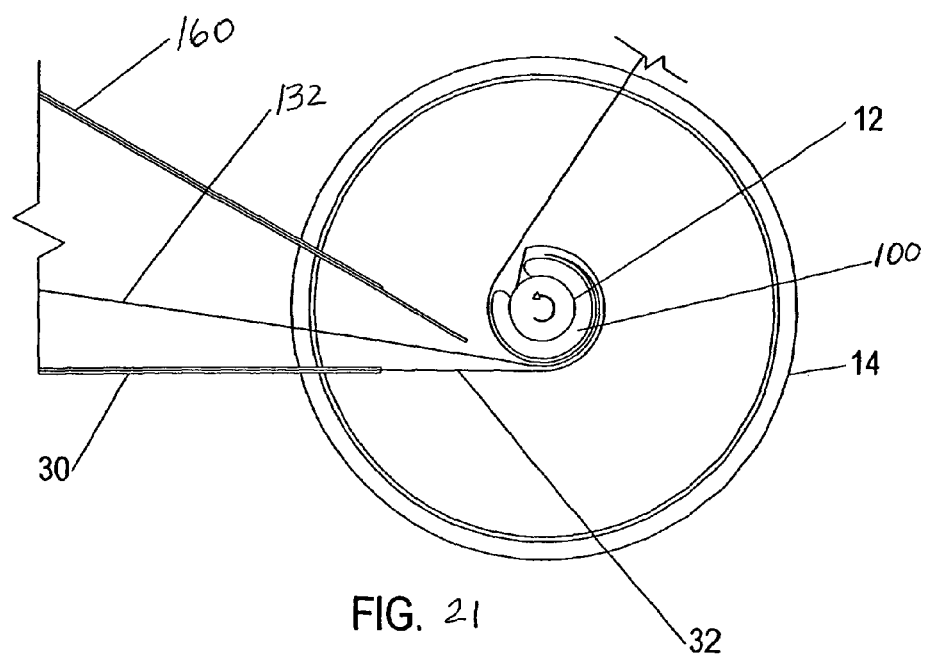
FIG. 21 is a schematic end view depicting how rotation of the tube and pin can wind positive electrode, negative electrode, and separator strips to form a spiral jellyroll electrode assembly.

FIG. 21 depicts how a jellyroll electrode assembly is formed in accordance with the present invention. The bare end of the substrate 32 of the positive electrode strip 30 is electrically connected to the pin 12. The slotted tube 100 contains the pin 12 and bare substrate end. A strip of insulating separator material 132, preferably polypropylene, and most preferably 25-µm polypropylene, such as CELGARD #2500, forms an envelope around the negative electrode strip 160, for example lithium or lithium covered copper. This enveloped negative electrode is then placed between plastic slotted tube 100 and positive electrode strip 30, whereby separator 132 prevents physical contact between the positive and negative active materials. After the strip 160 has been inserted, the aforementioned drive motor 112 is energized to rotate pin 12 via driver 110. Rotation of pin 12 functions to wind positive electrode strip 30, separator strip 132, and negative electrode strip 160 into the spiral jellyroll assembly.

Figure 22:
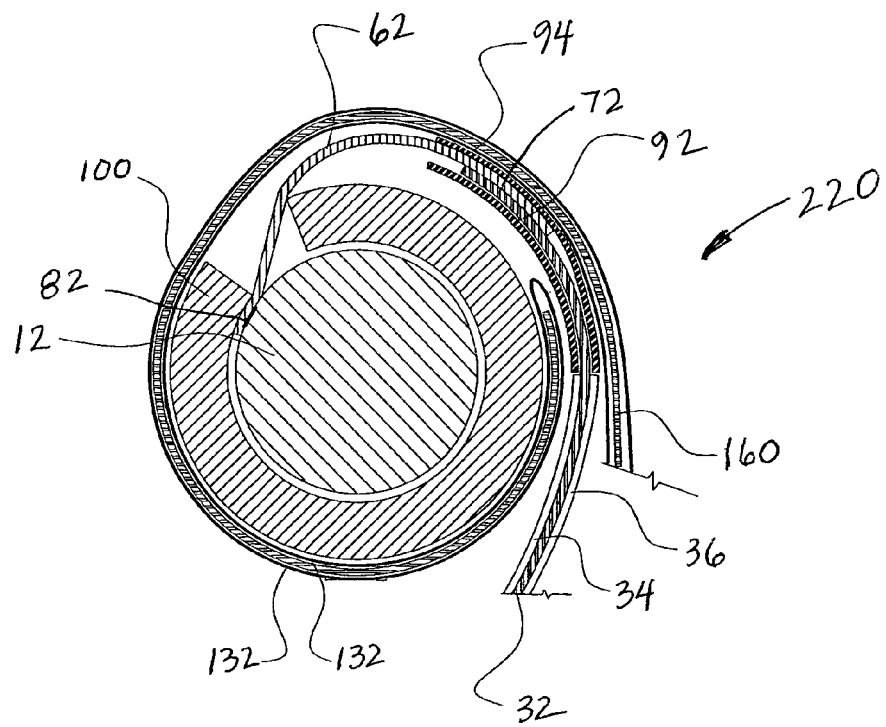
FIG. 22 is a schematic cross sectional view of the exemplary preferred embodiment of the present invention, including spacers and a plastic slotted tube, showing approximately the first wind of the jellyroll.

FIG. 22 shows layers of the first few turns of a spirally wound electrode assembly 220, using the spacers and plastic slotted tube of FIG. 15. Pin 12 is mechanically and electrically joined to interface material 62, forming a pin junction 82. Interface material 62 is mechanically and electrically joined to positive electrode substrate 32 at interface junction 72. Spacers 92, 94 are shown in the region of bare substrate 32, and having about the same thickness as active material 34, 36. They are shown to cover the region where interface material 62 has been joined to positive electrode substrate 32. Slotted tube 100 covers most of pin 12, including the pin junction 82. A separator 132 separates the positive and negative electrode layers. Negative electrode 160 is shown as a single layer for the sake of clarity, and may represent lithium foil. Alternatively, the negative electrode 160 described above comprising layers of active material such as lithium laminated onto foil such as copper foil may be used.

Although only the first few turns are shown, when completely wound, the electrode assembly 220 comprises multiple layers of strip material so that a cross section through the assembly 220 reveals a sequence of layers in the form pos/sep/neg/sep/pos/sep/neg/ . . . , etc.

Figure 23:
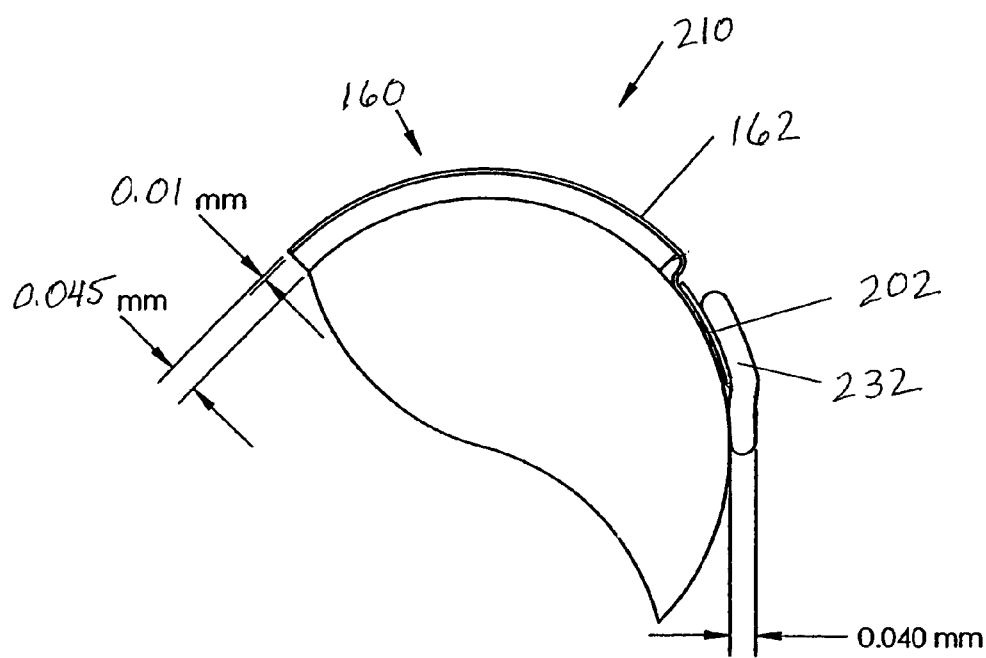
FIG. 23 is an enlarged sectional view showing how the outer turn of the negative electrode strip is taped to the next inner layer to close the jellyroll to minimize its outer radius dimension.

FIG. 23 is an enlarged sectional view showing how the outer turn of the negative electrode strip 160 is taped to the next inner layer to close the jellyroll to minimize its outer radius dimension, as taught in U.S. Pat. No. 6,677,076. The jellyroll is preferably fastened with DuPont KAPTON® tape 232 and inserted into a conductive case, preferably stainless steel. In an exemplary embodiment, the case is 22 mm in length and 2.9 mm in diameter.

In accordance with a preferred embodiment, tab 202 is welded to a second endcap which is in turn welded to the case. The tab is sufficiently flexible to enable the second endcap to close the case body second end after the interior cavity is filled with electrolyte via the open second end. In accordance with an exemplary preferred embodiment, tab 202 is welded to the inner face of the second endcap such that when the jellyroll is placed in the case, the tab locates the second endcap proximate to the case without obstructing its open second end. Preferably before filling, an electrode insulator (not shown), which may comprise a thin disk of DuPont KAPTON® polyimide film, is installed into the case between the rolled electrode assembly and the still open end of the battery case. The positive and negative active materials are activated with electrolyte, for example 1.2-M $LiPF_6$ PC/DME 3/7. After electrolyte filling, the case is sealed by bending the tab to position the second endcap across the case second end and then laser welding the endcap to the case.

Primary cells typically use active materials that tend to swell more than those used in secondary cells. Therefore, insulation is more of a concern for primary cells than for secondary cells, particularly in the first few winds of the jellyroll, making the plastic slotted tube 100 of FIG. 10 and the spacers of FIGS. 14-16 particularly useful for primary cells. On the other hand, primary cells generally can utilize materials that provide a stronger glass to metal seal as compared with secondary cells, so there is less of a need to isolate forces during winding, such as by using the reinforcing mandrel described in U.S. Pat. No. 6,670,071. However, if desired, the reinforcing mandrel taught therein may be combined with the plastic slotted tube and spacers taught herein.

The following example describes an electric storage battery and method for making it according to the present invention, and sets forth the best mode contemplated by the inventors of carrying out the invention, but is not to be construed as limiting. For example, alternative methods for preparing the negative electrode could be used, such as that described in copending patent application Ser. No. 10/264,870, filed Oct. 3, 2002, which is assigned to the assignee of the present invention and incorporated herein by reference in its entirety. Furthermore, although the Example given is for lithium batteries, the present invention is not limited to lithium chemistries, and may be embodied in batteries using other chemistries. As another example, some aspects of the present invention may be used in conjunction with assembly techniques taught in U.S. Pat. No. 6,670,071, U.S. Publication Nos. 2001/0046625; 2001/0053476, 2003/0003356, PCT Publication WO 03/061038 A1, and/or PCT Application Serial Number PCT/US03/21343, all of which are assigned to the assignee of the present invention and incorporated herein by reference.

EXAMPLE

A 20 mm×18.50 mm negative electrode was prepared by laminating 35 μm lithium foil onto both sides of 10 μm copper foil, for a total thickness of about 80 μm, leaving portions of the negative substrate free of lithium as described above to facilitate connections and allow room for adhesive tape.

A 15 mm×17 mm positive electrode was prepared by mixing $CF_x$, polytetrafluoroethylene (PTFE), carbon black, and carboxy methylcellulose (CMC) in a ratio of 80:4:10:6 to form a slurry, then coating the slurry onto both sides of a 20-μm thick aluminum foil and compressing it to a final total thickness of about 150 μm. Portions of positive active material were scraped off to leave portions of the positive substrate uncoated as described above.

A CP titanium interface material was used to join the aluminum positive electrode substrate to the CP titanium pin as described above. The negative electrode and positive electrode were then layered with a 25 μm polypropylene separator between them, and assembled with spacers and a polypropylene slotted tube as shown in FIG. 15. The plastic slotted tube was 1 mm OD×0.6 mm ID×25 mm long, with a wall thickness of approximately 0.2 mm, slit along its length to form a substantially closed tube. The spacers were 0.076 mm thick Kapton tape. A jellyroll electrode assembly was formed, beginning as shown in FIG. 22, and ending with the negative electrode as the outermost electrode layer, and with a layer of the separator material as the outermost layer of the electrode assembly to keep the lithium from sticking to the case during insertion of the jellyroll into the case, as described in PCT/US03/01334 cited above. Adhesive tape was applied to close the jellyroll in the manner described in U.S. Pat. No. 6,677,076. The jellyroll was inserted into a circular cylindrical stainless steel 0.1-mm thick case having a diameter of about 2.9 mm and a height of about 26 mm, for a total external volume of about 0.17 $cm^3$. An electrolyte comprising $LiPF_6$ in a mixture of ethylene carbonate (EC) and diethyl carbonate (DEC) (1.2 M in 3:7 solvent) was delivered to the electrode assembly. Although the plastic slotted tube can optionally be used as a conduit for electrolyte filling, it was not used as a conduit in this Example. The end of the battery case was closed, using the technique described above, hermetically sealing the case.

The battery produced in the Example was suitable for implanting in a human body, being hermetically sealed and very small. Due to its small diameter and circular cylindrical shape, the battery can be used in a device inserted into the body using a syringe-like device having a needle. The shape of the battery produced herein is not limited to having a circular cross section, and may have a cross section that is oval, rectangular, or other shape. Preferably, the cross sectional area is less than about 7 $mm^2$.

From the foregoing, it should now be appreciated that an electric storage battery construction and method of manufacture have been described herein particularly suited for manufacturing very small, highly reliable batteries suitable for use in implantable medical devices. Although a particular preferred embodiment has been described herein and exemplary dimensions have been mentioned, it should be understood that many variations and modifications may occur to those skilled in the art falling within the spirit of the invention and the intended scope of the appended claims.

We claim:

1. An electric storage battery, comprising:
   an electrode assembly in a case, the electrode assembly including:
   an elongate pin;
   first electrode strip and a second electrode strip wound together to form a spiral roll, each electrode strip having inner and outer ends,
      the first electrode strip attached to the pin directly or via an interface material;
      the first electrode strip including
         a substrate having a first face and a second face,
         the first face having a coated portion coated by a coating having a coating thickness,
         the first face having an uncoated portion on which the coating is not positioned,
         the uncoated portion being at the inner end of the first electrode strip,
         the coating including an active material;
   a first insulating spacer positioned on at least a portion of the uncoated portion and/or on at least a portion of the interface material,
      the first insulating spacer in a space between the first face of the substrate and the second electrode strip;
   a separator in the space between the first face of the substrate and the second electrode strip; and
   the substrate is not present in the space between the first face of the substrate and the second electrode strip.

2. The battery of claim 1, wherein the second face has a second coated portion coated by the coating and a second uncoated portion,
   the second uncoated portion being at the inner end of the first electrode strip, and further comprising
   a second insulating spacer positioned on at least a portion of the second uncoated portion and/or on at least a portion of the interface material.

3. The battery of claim 1, wherein the spacer has a thickness approximately equal to the coating thickness.

4. The battery of claim 1, wherein the spacer comprises polyimide.

5. The battery of claim 1, further comprising: a second separator separating the electrode strips.

6. The battery of claim 1, further comprising:
   a nonconductive slotted tube closely fitted around the pin and covering a junction between the pin and the first electrode strip or between the pin and interface material.

7. The battery of claim 6, wherein the slotted tube includes polypropylene.

8. The battery of claim 1, wherein the first insulating spacer is positioned on at least a portion of the uncoated portion.

9. The battery of claim 1, wherein the first insulating spacer is positioned on at least a portion of the interface material.

10. The battery of claim 1, wherein the first electrode strip is directly attached to the pin.

11. The battery of claim 1, wherein the first electrode strip is attached to the pin via the interface material.

12. The battery of claim 1, wherein a portion of the separator is between the second electrode and the first insulating spacer.

13. The battery of claim 1, wherein the coating is not positioned between the spacer and the first face of the substrate.

14. An electric storage battery, comprising:
   an electrode assembly in a case, the electrode assembly including:
   an elongate pin; and
   first and second opposite polarity electrode strips wound together to form a spiral roll, each electrode strip having inner and outer ends, the first electrode strip being attached to the pin directly or via an interface material; and
   a nonconductive slotted tube closely fitted around said pin and covering a junction between the pin and the first electrode strip or between the pin and interface material.

15. The battery of claim 14, wherein the slotted tube includes polypropylene.

16. The battery of claim 14, wherein the slotted tube has a wall thickness of 0.5 to 0.75 mm.

* * * * *